United States Patent [19]

Cornell

[11] 4,210,573
[45] Jul. 1, 1980

[54] POLYOLEFIN CONTAINERS HAVING IMPROVED GAS BARRIER PROPERTIES

[75] Inventor: Stephen W. Cornell, Naperville, Ill.

[73] Assignee: The Continental Group, Inc., New York, N.Y.

[21] Appl. No.: 967,344

[22] Filed: Dec. 7, 1978

[51] Int. Cl.² ............................................. C08K 9/06
[52] U.S. Cl. .............................. 260/42.15; 260/42.46
[58] Field of Search .................... 260/42.15; 260/42.46

[56] References Cited

U.S. PATENT DOCUMENTS 4,013,610  3/1977  Tomohiro et al. ................. 260/42.15

4,122,147  10/1978  Vrcelj ................................. 264/255

Primary Examiner—Lewis T. Jacobs
Attorney, Agent, or Firm—Paul Shapiro; Joseph E. Kerwin; William A. Dittmann

[57] ABSTRACT

Polyolefin containers having improved gas barrier properties are compression molded from billets formed from polyolefin resins filled with inorganic fillers. The gas barrier properties of the containers are stabilized against loss under conditions of sterilization by treating the fillers with a polar silane compound.

7 Claims, No Drawings

POLYOLEFIN CONTAINERS HAVING IMPROVED GAS BARRIER PROPERTIES

TECHNICAL FIELD

This invention relates to polyolefin containers and more particularly to polyolefin containers having improved gas barrier properties.

BACKGROUND ART

In the manufacture of canned foodstuffs, e.g., meat products as ham, corned beef hash, chili and beef stew, the containers, usually metal cans, are filled with the foodstuff, covered with a metal end closure and sealed.

One of the disadvantages of canning meat products in metal containers is that the presence of the food product may cause the interior of the container to corrode, which corrosion results in contamination and deterioration of the food product.

Attempts to substitute certain inert synthetic resin materials, such as polyethylene and polypropylene for metal in the canning of foodstuffs, have encountered the disadvantage that such resin materials are excessively permeable to gases, such as oxygen, and the permeation of oxygen into the container causes an undesirable discoloration and a depreciation in the taste and qualities of the foodstuff.

The high gas permeability characteristics of synthetic resins, such as polyethylene, has resulted in containers fabricated from such resins being rejected in the packaging of oxygen sensitive comestibles where due to the chemical inertness of the resin, it might otherwise be employed to great advantage.

The art has devised a number of ways to reduce the gas permeability of polyethylene and other polyolefin resins. Included in these methods is the fabrication of the container from a thermoplastic resin wherein an inorganic mineral filler material such as clay or mica, or a gas impermeable resin such as Saran is incorporated in the resin. Examples of this art include U.S. Pat. Nos. 3,463,350, 3,923,190 and 4,102,974.

In U.S. Pat. No. 4,122,147 there is described a preferred method for the manufacture of containers from mineral filled polyolefin resins having improved gas barrier properties which are sealable with metal closures.

In the method disclosed in U.S. Pat. No. 4,122,147, the container is compression molded from a multilayer billet having a plurality of polyolefin layers, a first of these layers being comprised of a polyolefin resin composition exhibiting relatively high flexibility when molded, and a second of these layers being comprised of a polyolefin resin having incorporated therein a mineral filler which reduces the gas permeability of the resin. The first and second layers, when heated to a plasticized state and subjected to a compressive force, flow at non-uniform rates, the first layer flowing at a faster rate than the second layer.

In forming a container in accordance with U.S. Pat. No. 4,122,147, the billet is placed in a molding chamber and is compressed between a pair of die members with sufficient force to cause the layers of the billet to flow radially outward from between the die members at a differential rate into a mold cavity defining the sidewalls of the container. As the die members are advanced through the molding chamber, the faster flowing, more flexible, first layer is extruded into the mold cavity ahead of the remaining layers of the billet and forms the flange and exterior surface portions of the container whereas the slower moving second layers form the interior surface portions of the container.

The advancement of the die members through the molding chamber causes a continuous layer of multilayer material to be deposited and solidified within the mold cavity, the walls of which are maintained at a temperature below the solidification temperature of the extruded material. The extruded material, cooled to its solidification temperature, forms an integral solid hollow article having a multilayer side wall and bottom structure which is then ejected from the molding chamber.

Containers molded by the process of U.S. Pat. No. 4,122,147 from a polyethylene multilayer billet in which the second layer contains heavy loadings of mica, e.g., 40–50% by weight mica, when sealed with a metal end, have an oxygen leak rate when measured with a Mocon Oxtran 100 instrument of about 0.2 cc/100 in.$^2$ day atmos. at 73° F.

Containers generally require an oxygen leak rate of less than 0.5 cc/100 in.$^2$ day atmos. at 73° F. in order to be considered for the packaging of oxygen sensitive foodstuffs.

Although multilayer containers manufactured from mineral filled polyolefin resins have gas barrier properties that render them suitable for the packaging of oxygen sensitive foods, the containers have the disadvantage that when subjected to sterilization conditions, the gas barrier properties of the containers unexpectedly undergo a change to higher, more permeable values which then render the containers unsuitable for the packaging of the intended foodstuffs.

Thus in the packaging of foods such as fruit, beans, vegetables, meat and fish it is required that the foods be sterilized in the container. In such sterilization processes hermetically sealed containers having the food to be sterilized packaged therein are usually placed in a high pressure autoclave in which they are subjected to temperatures of 230°–270° F. with steam under pressure, e.g., 15 psig, for a sufficient time, e.g., 15–90 minutes, to destroy bacterial life.

When multilayer containers manufactured using mineral filled polyolefin resins such as mica filled high density polyethylene, are subjected to the sterilization conditions just described, the oxygen leak rate of such containers has been found to rise to above 0.5 cc/100 in.$^2$ day atoms. at 73° F., which is unacceptable for the commercial use of such containers in the packaging of oxygen sensitive foods.

DISCLOSURE OF INVENTION

In accordance with the practice of the present invention there is provided a container formed from an inorganic mineral filled polyolefin resin, the container having gas barrier properties which are stable to substantial change when subjected to sterilizing conditions, the inorganic mineral filler being treated, prior to its incorporation in the resin, with a polar silane.

BEST MODE FOR CARRYING OUT THE INVENTION

The term "polyolefin" includes within its meaning olefin polymers, such as polyethylene, polypropylene, poly-1-butene, poly-4-methyl-pentene-1 and other homopolymers and copolymers of similar mono-1-olefins having up to 8 carbon atoms per molecule. Of these, high density (0.950–0968) polyethylene and polypropylene are preferred.

In preparing mineral filled polyolefin compositions having gas barrier properties in accordance with the practice of the present invention, the polyolefin resin, desirably in the form of a powder having a median particle size of 5 to 100 microns and preferably 20 to 60 microns, is admixed with the silane modified mineral filler in blends containing about 10 to about 70% by weight of the polyolefin and about 30 to about 90% by weight of the filler and preferably about 35 to about 60% by weight of the polyolefin and about 40 to about 65% by weight of the filler.

The filler blended with the polyolefin is also advantageously in micron sized powder form, the filler particles having a median diameter which varies from 20 to 250 microns and preferably from 30 to 180 microns.

Inorganic mineral fillers which may be treated with silane for incorporation into polyolefin resins used to prepare containers of the present invention include kaolin, $CACO_3$, siliceous fillers such as silica, aluminum silicate as well as inert lamellate filler materials such as mica wollastonite and talc.

Polar silanes which are reacted with the inorganic mineral fillers in accordance with the process of the present invention include silane compounds having the formula $SiR_1R_2R_3(CH_2)_xR_4$ wherein $R_1$, $R_2$ and $R_3$ are alkoxy groups and $R_4$ is a polar group containing moiety such as an amino group, an (aminoethyl)amino group, a cyano group and a trifluoro group and x is an integer of 1–3.

In preparing mineral fillers for incorporation in polyethylene it is preferred that the polar silane used as the treating agent have a surface tension value closely approximating that of the polyolefin resin into which the silane treated filler is to be incorporated. For example, gamma-aminopropyltriethoxy-silane which has a surface tension value of 35 dynes/cm$^2$ has been found to be very advantageous in the treatment of inorganic mineral fillers for incorporation into polyethylene resin which resin has a surface tension value of 33.5 dynes/cm$^2$.

It is believed that if the silane has a surface tension value approximately that of the polyolefin resin into which it is incorporated, the wetting properties of the filler treated with such silane will be maximized, thereby improving the compatibility of the filler with resin.

In preparing the silane treated fillers, the polar silane is applied to mineral filler at a concentration of about 0.5 to 5.0% by weight and preferably about 1.0 to about 3.0% by weight based on the weight of the filler. In treating the inorganic mineral filler with the polar silane, the silane is dissolved at a concentration of about 10 to about 35% by weight in an organic diluent which is a solvent for the silane such as an aliphatic alcohol such as methanol, ethanol, n-propanol, isopropanol and the solution is applied to the filler. The filler and silane solution is agitated for a time sufficient, e.g., 15 minutes to 24 hours, to permit complete surface contact between the filler and silane to occur. Thereafter the treated filler is separated from the silane solution and is heated to about 80° to 110° C. to remove the diluent.

The polar silane treated filler compositions of the present invention can be blended with one or more polyolefins by conventional blending techniques such as by mechanically working a mixture of the polyolefin and the silane treated filler particles by milling or extruding at 100°–180° C. to produce a substantially homogeneous composition.

In manufacturing containers from mixtures of the silane treated filler and polyolefin resins of the present invention, it is preferred that the containers be compression molded from a multilayered billet prepared using a mixture of the silane treated mineral filler and the polyolefin resin.

The multilayered billet used in accordance with the present invention can be any shape such as circular, square or polygonal. The actual dimensions of the billet will be determined by experimentation with the particular molding chamber and die member configuration and the total volume of the billet will be that which is sufficient to meet the dimensional requirements of the desired container.

A method for preparing the multilayered billet is to compact separate layers of resin powders of different composition which may contain silane treated fillers admixed therewith. In preparing such billet, the layers are formed by alternatively charging and compressing the different polyolefin and filler powder mixtures of which the multilayered billet is to be formed in a compacting chamber at relatively high pressures, e.g., 6,000 to 30,000 pounds per square inch (psi), to the desired shape and contour of the billet. Thereafter, the compacted layers are heated to a temperature of about 10° to 175° F. above the melting temperature of the polyolefin resin for a time sufficient to fuse the resin particles. The so-prepared, heated billet is then ready for subsequent compression molding to form the multilayer container. Preferably the molding process used is that which is disclosed in U.S. Pat. No. 4,122,147, the disclosure of which is incorporated herein by reference.

The invention is further illustrated by the following Examples.

EXAMPLE I

A mica filler treated with a polar silane compound in accordance with the present invention was prepared by placing 1000 grams of the filler particles in a Welex mixer. To the mixer was added (during mixing at 100 rpm) 20 grams of γ-amino propyltriethoxy silane dissolved in 150 mls. ethanol. Mixing was continued for about 10 minutes at 600–1600 rpm to permit the γ-amino propyltriethoxy silane to coat the particles. Mixing was discontinued and the moist filler was dumped into an aluminum drying pan and the pan placed in a forced air oven and dried at 105° C.

The mica particles treated in this manner were as follows:

| Mica Type | Particle Size, Microns |
| --- | --- |
| Phlogophite | 60 |
| Muscovite | 33 |

Bilayer billets were formed by first feeding to a compacting device, 15.1 grams of mixture of powders containing 68% by weight polyethylene powder having a density of about 0.95 g/cc and a median particle diameter of about 25 microns, 30% by weight $CaCO_3$ particles having a median particle diameter of about 11 microns and 2% by weight $TiO_2$ pigment to form the lower layer of the billet. To the top surface of the lower layer was applied 17.3 grams of a mixture of powders composed of 48% by weight of the polyethylene powder, 50% by weight of the silane treated mica particles and 2% by weight $TiO_2$ to form the upper layer of the billet.

The bilayered article was compacted at about 6000 psi into 2.5 inch diameter discs having a thickness of about 400 mils. The upper layer had a thickness of about 210 mils and the lower layer had a thickness of about 190 mils. The discs were heated in a heating device to about 350° F. for about 8 minutes under ambient pressure conditions. At the end of the heating period, the heated discs were placed in a compression molding apparatus of the type described in U.S. Pat. No. 4,122,147.

Compression molding of the discs at 40,000 psi was effected with a 30 ton mechanical press to form a flanged bilayer cylindrical hollow container having a flange thickness of 20 mils and a sidewall thickness of 32 mils constructed of a polyethylene/CaCO$_3$ outer layer and a polyethylene/mica inner layer and a bottom wall thickness of 35 mils of the same construction as the sidewall. The container flange could be double seamed with a steel end closure without fracture.

The oxygen leak rate of the bilayer container was measured by closing the open end by double seaming with a metal end and attaching the closed container to a Mocon Oxtran 100 instrument. The oxygen leak rates of the containers are recorded in Table I below.

To determine the effect of sterilization conditions on the containers, the containers formed from the discs prepared in Example I were filled with water, sealed and were placed in a steam autoclave of the type conventionally used for the sterilization of food containers. The sealed containers were sterilized at 124° C. for 90 minutes at 30 psi overriding air pressure. After this exposure to sterilization conditions, the oxygen leak rate of the sterilized containers were measured and the results are also recorded in Table I below.

For purposes of comparison, the procedure of Example I was repeated with the exception that mica particles which had not been treated with γ-aminopropyl-triethoxy silane were substituted for the silane treated mica used in the preparation of the containers of Example I. The oxygen leak rates of the comparative containers measured before and after exposure to the sterilization conditions used in Example I are also recorded in Table I, the comparative containers being designated by the symbol "C".

Table I

| Container No. | Filler | Oxygen Leak Rate ccO$_2$/100 in.$^2$ day @ 73° F. Before Sterilization | After Sterilization | % Change in Leak Rate |
|---|---|---|---|---|
| 1. | Silane treated Phlogopite Mica | 0.231 | 0.288 | 22 |
| 2. | Silane treated Phlogophite Mica* | 0.189 | 0.191 | 1 |
| 3. | Silane treated Muscovite Mica | 0.290 | 0.320 | 13 |
| C$_1$ | Phlogopite Mica | 0.256 | 0.760 | 197 |
| C$_2$ | Muscovite Mica | 0.302 | 0.551 | 82 |

*60% Loading

EXAMPLE II

The procedure of Example I was repeated with the exception that three different γ-aminopropyltriethoxysilane treated mineral fillers, namely, calcium carbonate, talc and amorphous silica, were individually substituted for the mica filler used in Example I. The oxygen leak rates of the containers compression molded from bilayer polyethylene billets containing these silane treated fillers in the lower layer before and after exposure to sterilization conditions are recorded in Table II below.

For purposes of comparison, the procedure of Example II was repeated with the exception that mineral fillers which had not been treated with γ-aminopropyl-triethoxy-silane were used in place of the silane treated fillers. The oxygen leak rates of the comparative containers measured before and after exposure to the sterilization conditions are also recorded in Table II, the comparative containers being designated by the symbol "C".

Table II

| Container No. | Filler | Filler Particle Size (μ) | Oxygen Leak Rate ccO$_2$/100 in.$^2$ day @ 73° F. Before Sterilization | After Sterilization | % Change in Leak Rate |
|---|---|---|---|---|---|
| 1. | Silane treated CaCO$_3$ | 12 | 0.532 | 0.505 | −5 |
| 2. | Silane treated Talc | 65 | 0.373 | 0.407 | 9 |
| 3. | Silane treated Amorphous Silica | 2.3 | 0.560 | 0.581 | 4 |
| C$_1$ | CaCO$_3$ | 12 | 0.494 | 0.638 | 30 |
| C$_2$ | Talc | 65 | 0.434 | 0.709 | 63 |
| C$_3$ | Amorphous Silica | 2.3 | 0.542 | 1.032 | 90 |

It is immediately apparent from an examination of the data recorded in Tables I and II above that containers compression molded from polyethylene filled with silane treated fillers do not have appreciably improved gas barrier properties when compared with containers compression molded from polyethylene filled with untreated fillers but that the oxygen leak rates of containers prepared from polyethylene resin having incorporated therein silane treated fillers undergo substantially less detrimental change in gas barrier properties when exposed to sterilization conditions as compared with sterilized containers prepared from polyethylene resins filled with untreated fillers.

What is claimed is:

1. In a process for compression molding containers from billets prepared from polyolefin resins having incorporated therein inorganic fillers to impart low oxygen gas permeability thereto the improvement which consists essentially of treating the fillers prior to their incorporation in the polyolefin resin with a polar silane compound having the general formula $$SiR_1R_2R_3(CH_2)_xR_4$$

wherein $R_1$, $R_2$ and $R_3$ are alkoxy groups and $R_4$ is a polar group selected from the group consisting of amino, (aminoethyl) amino, cyano and trifluoro and x is an integer of 1 to 3 whereby the containers when subjected to food sterilization conditions undergo a limited change in gas permeability.

2. The process of claim 1 wherein the polyolefin resin is polyethylene.

3. The process of claim 1 wherein the polar silane is γ-aminopropyltriethoxy-silane.

4. The process of claim 1 wherein the filler is mica.

5. The process of claim 1 wherein the filler is $CaCO_3$.

6. The process of claim 1 wherein the filler is talc.

7. The process of claim 1 wherein the filler is amorphous silica.

* * * * *